United States Patent
Lopez et al.

(10) Patent No.: US 10,838,523 B2
(45) Date of Patent: Nov. 17, 2020

(54) SYSTEM AND METHOD FOR REGISTERING AND IDENTIFYING AN INPUT KNOB OF A TOUCH SCREEN DEVICE

(71) Applicant: Visteon Global Technologies, Inc., Van Buren Township, MI (US)

(72) Inventors: Carlos A. Lopez, Queretaro (MX); Omar Alejandro Martinez Vega, Queretaro (MX); David Whitton, Saline, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 16/161,654

(22) Filed: Oct. 16, 2018

(65) Prior Publication Data

US 2020/0117288 A1    Apr. 16, 2020

(51) Int. Cl.
| | |
|---|---|
| *G06F 3/0362* | (2013.01) |
| *G06F 3/041* | (2006.01) |
| *B60K 37/06* | (2006.01) |
| *G01D 5/244* | (2006.01) |

(52) U.S. Cl.
CPC .......... *G06F 3/0362* (2013.01); *G01D 5/244* (2013.01); *G06F 3/0412* (2013.01); *G06F 3/0418* (2013.01); *B60K 37/06* (2013.01)

(58) Field of Classification Search
CPC .... G06F 3/0362; G06F 3/0418; G06F 3/0412; G01D 5/244; B60K 37/06; G01P 13/04
See application file for complete search history.

(56) References Cited

U.S. PATENT DOCUMENTS

| | | | |
|---|---|---|---|
| 5,936,613 A | 8/1999 | Jaeger et al. | |
| 7,602,376 B1 | 10/2009 | Hetherington | |
| 8,330,713 B2 | 12/2012 | Stelandre et al. | |
| 9,925,456 B1* | 3/2018 | Hershey | A63F 13/98 |
| 10,551,798 B1 | 2/2020 | Bushnell et al. | |
| 2009/0079712 A1* | 3/2009 | Levin | G05G 9/047 345/184 |
| 2013/0016204 A1* | 1/2013 | Hocke | G02B 21/362 348/79 |
| 2013/0241822 A1* | 9/2013 | Sharma | G06F 3/02 345/156 |
| 2015/0169080 A1 | 6/2015 | Choi et al. | |
| 2016/0349859 A1* | 12/2016 | Seitz | G06F 3/0488 |
| 2017/0153718 A1* | 6/2017 | Brown | G06F 3/0362 |
| 2017/0293380 A1 | 10/2017 | Chauveau et al. | |

\* cited by examiner

*Primary Examiner* — Brent D Castiaux
(74) *Attorney, Agent, or Firm* — Quinn IP Law (57) ABSTRACT

A touch screen device includes a display screen having a touch surface, an input knob, and a microcontroller programmed to execute a method. The knob has a stationary member with conductive base pads facing the surface and a moveable member. The knob lacks a direct electrical connection to the surface. The microcontroller receives encoder signals as the moveable member moves with respect to the stationary member, with the signals being indicative of discrete touch events between the moveable member and the screen, e.g., via an intervening switch. The microcontroller processes the encoder signals to determine a direction of movement of the knob, and derives a true position of a center point of the knob using a position of each of the base pads. The microcontroller then controls an operation of the touch screen device.

18 Claims, 5 Drawing Sheets

SYSTEM AND METHOD FOR REGISTERING AND IDENTIFYING AN INPUT KNOB OF A TOUCH SCREEN DEVICE

TECHNICAL FIELD

The present disclosure relates to systems and methods for automatically registering and identifying an input knob of a touch screen device.

BACKGROUND

Touch screen devices facilitate direct user interaction with a wide variety of systems. For example, infotainment systems present user-selectable control options and other useful information to a user via a colorful display screen having a touch surface. The user selects information or requests execution of a desired operating mode by touching a corresponding location on the surface. A touch event may be registered by a microcontroller based on detected contact with the screen by the user's fingertip, a stylus, or another input member.

A given touch screen device relies on a particular set of underlying touch detection technology to accurately register a touch event, and to thereafter translate the touch event into a corresponding screen position. For instance, a projective capacitance-based touch screen uses an electrode grid to project an electric field through a substrate. User contact with the touch surface at or more discrete points is detected by monitoring electrical effects on the electrode grid. Because the touch point corresponds to a touch surface location with associated information, the detected touch point is readily translated into a desired control response associated with the information. Other types of touch screen devices rely on different underlying technologies, such as surface capacitive, infrared, or resistance sensing to achieve similar ends.

SUMMARY

Systems and methods are disclosed herein for automatically registering and identifying a moveable input device for use with a touch screen device having a display screen with a touch-sensitive surface/touch surface. The input device is referred to hereinafter as an "input knob" for simplicity, with the term "knob" broadly encompassing any flat, concave, or convex structure of an application-suitable diameter and shape. The disclosed input knob also floats with respect to the touch surface in the sense that (a) the disclosed knob structure is characterized by an absence of conductive wires or other direct electrical connections extending between the knob and the touch surface, and (b) the disclosed knob structure may be, in some embodiments, removably connected to and disconnected from the touch surface.

In order to register discrete touch points, the input knob in some embodiments relies on periodic actuation of internal switches to connect or disconnect a sufficiently large conductive mass housed in the knob respectively to or from the touch surface. Such a connection occurs by direct contact with the touch surface through intervening conductive base pads of the input knob. The base pads may be positioned at two, three, or more locations around the circumference of a fixed member of the input knob as set forth herein. Other embodiments of the input knob may be envisioned within the scope of the disclosure, e.g., infrared or other variations of the disclosed example embodiments, and therefore the methodology described herein could be applied to other touch detection technologies outputting similar digital encoder signals but not necessarily relying on a conductive mass/spring approach. Therefore, the conductive mass variation described herein is intended to be illustrative of the present teachings and non-limiting.

Touch functionality may be enhanced in certain applications by use of the disclosed input knob. When using the input knob as an external mechanical input device, the knob's rotary and/or translational movement will produce a stream of electrically-decoupled digital bits, i.e., a plurality of digital encoder signals having a binary logical state of high/1 during a positive touch event between at the touch surface and low/0 otherwise, with the non-contact state also referred to herein as a negative touch event. The number of digital encoder signals matches the number of conductive base pads of the input knob, with the base pads forming fixed reference points on the touch surface and ultimately corresponding to the location of at least some discrete touch points.

A microcontroller is also used as part of the present strategy. The microcontroller is in communication with the touch surface, such as over an I2C bus or other suitable low-voltage connection, and is programmed in software and configured in hardware to accurately identify the input knob as being of a particular configuration or type, locate the position of the input knob on the touch surface, and register a touch event on the touch surface at the position. The microcontroller ultimately receives and transfers digital information in the overall control of the touch screen device and/or a controlled subsystem.

As described herein, it may be possible at a point of assembly to have different available input knob configurations or types, such as a stock of multiple input knobs of different diameters, shapes, and/or number of conductive base pads. The population of such input knobs is described herein as a set of candidate input knobs, as any one of the input knobs may be permanently or removably attached to a given touch surface in this embodiment. Likewise, the same input knob may be used in a left-hand or a right-hand screen location, e.g., for left-hand or right-hand drive options in a vehicle application, and/or more than one input knob may be used on one touch surface.

Therefore, as part of the present approach the microcontroller of a given touch screen device may be optionally programmed with alternative display content, such as multiple graphical programs, with the microcontroller selecting and executing one of the graphical programs that corresponds to the identified input knob and/or surface position thereof, and thus displaying information corresponding to the identified input knob and position. That is, the microcontroller may adjust a layout of a display option based on the location of the input knob with respect to the touch surface. Such an embodiment may enable a given touch screen device to be reconfigured during assembly or when in use, such as by detaching the existing input knob and attaching a different knob type, with the microcontroller automatically recognizing the new knob type using the present method.

An example approach uses two conductive base pads, and thus analyzes two discrete touch points. The conductive base pads may be positioned at an angle of less than about 180° with respect to each other in an example embodiment. Because the two base pads are not perfectly aligned through a common line through the knob's center point, two potential position solutions exist for the knob's true position. One position solution will lie outside of an area of the input knob and can be discarded by the microcontroller. Therefore, the present method may include automatically discerning the xy coordinates of the knob's true center point and thereafter using the true center point and movement direction when executing control actions of the touch screen device.

In an example embodiment, a touch screen device includes a display screen having a touch surface, an input knob having a stationary member and a moveable member, and a microcontroller. The stationary member, which may be removable and repositionable with respect to the touch surface in some embodiments, contacts the touch surface. The microcontroller is programmed to receive digital encoder signals from operation of the input knob as the moveable member moves, e.g., rotates and/or translates, with respect to the stationary member, with the digital encoder signals being indicative of a plurality of discrete touch events between the moveable member and the touch screen. The microcontroller processes the encoder signals to determine the knob's direction of movement, and also derives a true position of the knob's center point using a position of each of the base pads. The microcontroller thereafter controls an operation of the touch screen device.

Optionally, the microcontroller may be programmed with a plurality of display options as noted above, with the microcontroller uniquely identifying the input knob from among a plurality of candidate input knobs using the true position and the base pad positions. In such an embodiment, the microcontroller may select a display option from the various display options, doing so based on the identity of the input knob.

A method is also disclosed for registering and identifying an input knob for a touch screen device having a display screen with a touch surface. In this embodiment, the input knob includes a stationary member having a plurality of conductive base pads oriented facing the touch surface, and a moveable member that contains a conductive mass and is moveable with respect to the stationary member. The input knob is characterized by an absence of a direct electrical connection to the touch surface.

The method includes receiving a plurality of digital encoder signals as the moveable member moves with respect to the stationary member, with the digital encoder signals being indicative of a plurality of discrete touch events between the conductive mass and at least one of the plurality of conductive base pads. The method includes processing the digital encoder signals to determine a direction of movement of the moveable member as a first value, and also deriving a true position of a center point of the input knob as a second value using a position of each of the conductive base pads. The method also includes controlling an operation of the touch screen device using the first and second values.

The moveable member may be rotatable with respect to the stationary member in some embodiments, in which case processing the digital encoder signals to determine a direction of movement includes determining a direction of rotation of the moveable member.

The above features and advantages and other features and advantages of the present teachings are readily apparent from the following detailed description of the best modes for carrying out the teachings when taken in connection with the accompanying drawings.

The present disclosure may have various modifications and alternative forms, and some representative embodiments are shown by way of example in the drawings and will be described in detail herein. Novel aspects of this disclosure are not limited to the particular forms illustrated in the above-enumerated drawings. Rather, the disclosure is to cover modifications, equivalents, and combinations falling within the scope of the disclosure as encompassed by the appended claims.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Figure 1:
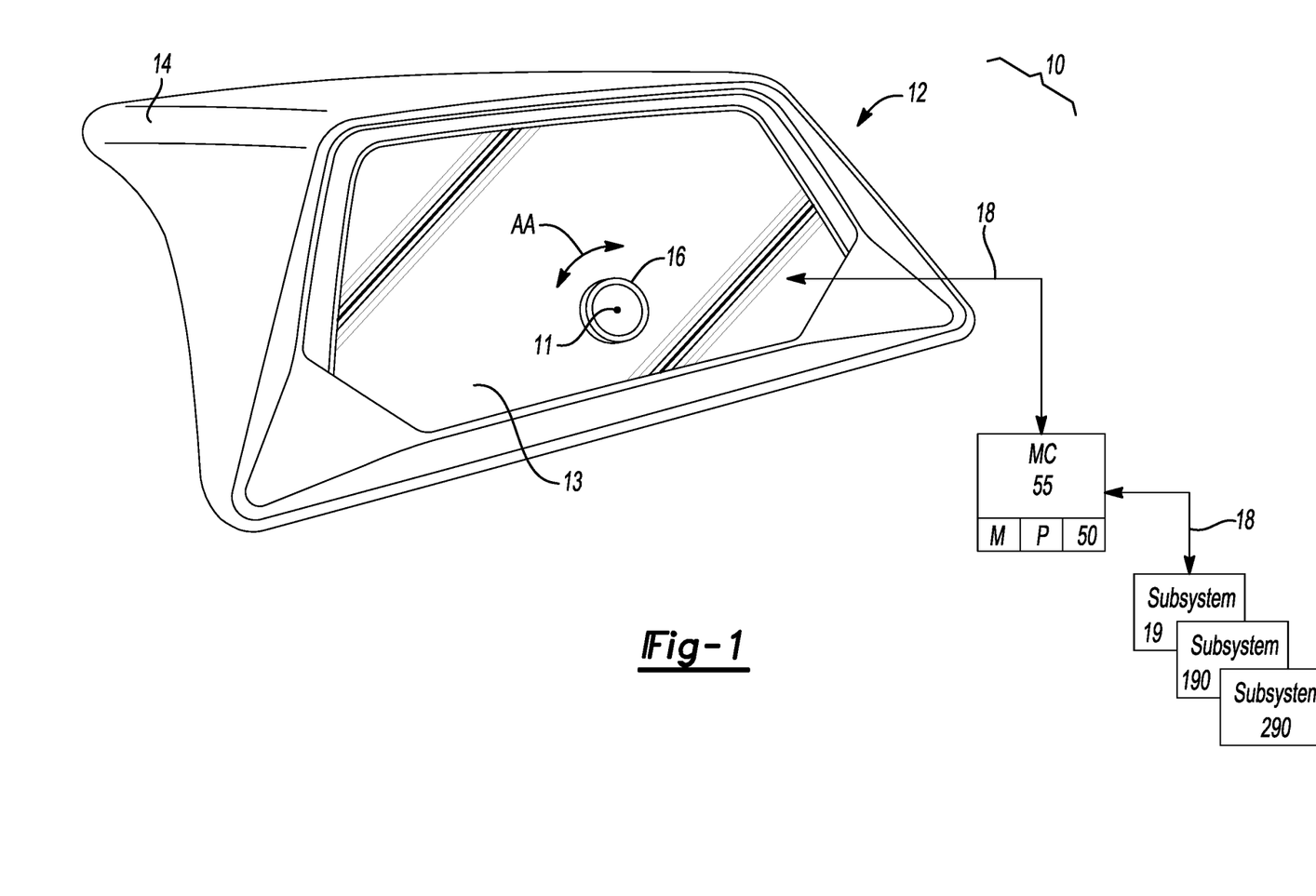
FIG. 1 is a schematic perspective view illustration of an example touch screen device having a display screen with a touch surface and an input knob, with the input knob automatically identified and registered via the method described herein.

Referring to the drawings, wherein like numerals indicate like parts throughout the several views, a system 10 is shown schematically in FIG. 1. The system 10 includes a touch screen device 12, a floating input knob 16, and a microcontroller (MC) 55, and may also include or be in communication with one or more controlled subsystems 19, 190, and/or 290 as described below. The touch screen device 12 has a touch surface 13 that is optionally embodied as a capacitive touch surface of the type well understood in the art. Other underlying technologies suitable for detecting touch events in the manner described herein may be used within the scope of the disclosure.

Performance of the touch screen device 12 may be enhanced by the addition of the input knob 16. While one such input knob 16 is shown for simplicity, additional input knobs 16 may be used in other embodiments. The input knob 16 may be rotatable about its center point 11 in some embodiments as indicated by double-headed arrow AA. In other embodiments, the input knob 16 may be translated away from its center point 11 as the contemplated movement. As noted above, the input knob 16 is characterized by an absence of conductive wires or other direct electrical connections between structure of the input knob 16 itself and the touch surface 13 of the touch screen device 12. The input knob 16 in some exemplary embodiments may be detached and repositioned elsewhere on the touch surface 13, with the microcontroller 55 automatically registering and identifying the input knob 16 upon reattachment. In other embodiments, the touch surface 13 may have designated zones, whereupon removably attaching the input knob 16 to the touch surface 13 within one of the designated zones may command corresponding functionality.

The manner in which the input knob 16 attaches to the touch surface 13, e.g., via a suitable adhesive material, may give rise to position uncertainty during manufacturing and when the input knob 16 is in use. To ensure proper identification, location, and subsequent use of the input knob 16, therefore, the microcontroller 55 may be programmed to execute the present method 50, with structure and function of the input knob 16 and application of the method 50 described in detail below with reference to the remaining figures.

The input knob 16, which is positioned with respect to the touch surface 13, is configured to selectively register touch events on the touch surface 13 at multiple discrete points, with two and three such points described herein as illustrative examples. The terms "touch event" and "touch point" are used interchangeably herein, with the touch event in the example embodiment of FIG. 4 being a state of direct continuous connection of a conductive mass 23 of the input knob 16 to a conductive base pad 24, through intervening switch structure, and with the touch point being the particular point or points on the touch surface 13 corresponding to such an event. Four or more such touch events/points may be used in other embodiments for addition performance features. For example, a user may rotate or translate the input knob 16 to a corresponding position on the touch surface 13 in order to select a desired operating mode of a controlled subsystem 19, 190, and/or 290, and/or the user may register a touch input via activation of the input knob 16 itself, with the latter option possibly outputting a corresponding data bit.

In spite of the potential advantages of using a separate mechanical input device in conjunction with the touch surface 13, the relative placement of the input knob 16 may vary slightly from one touch screen device 12 to another, and/or a user may elect to replace the input knob 16 at some point in the life cycle of the touch screen device 12. Positional variation may occur due to manufacturing tolerances, operator/environmental variability, ordinary wear and tear, or other factors, any or all of which may cause the microcontroller 55 to temporarily lose track of the true position and/or direction of motion of the input knob 16 relative to the touch surface 13. The present method 50 is therefore directed toward solving this and other potential control challenges by providing a computer-executable method to be executed prior to or during the ongoing use of device 12.

The touch screen device 12 of FIG. 1 is in communication with the microcontroller 55 over a suitable low-voltage bus 18, with the term "low-voltage" generally referring to auxiliary voltage levels of 12V or less, e.g., 5V. In a possible embodiment, the low-voltage bus 18 may be a two-wire I2C bus. The microcontroller 55 may include one or more processors (P), each of which may be embodied as a separate microprocessor, an application specific integrated circuit (ASIC), or a dedicated electronic control module. The microcontroller 55 also includes sufficient amounts of memory (M), i.e., random access memory, read-only memory, and flash memory or other types of electrically-erasable read-only memory, as well as accompanying hardware in the form of a high-speed clock or timer, input/output circuitry, etc. Computer-readable and executable instructions embodying the present calibration method 50 may be stored in memory (M) and executed as set forth herein to calibrate the touch screen device 12.

The touch screen device 12 of FIG. 1 may be optionally secured and protected within a housing 14. For instance, when the system 10 is configured as combined information and entertainment ("infotainment") system or as a navigation system, the housing 14 may be surrounding structure of an instrument panel, dashboard, or center-stack of a vehicle (not shown). Alternatively, the system 10 may be used as part of a control or monitoring station of a power plant, or as part of a human-machine interface of an appliance or other system 10. Solely for illustrative consistency, the touch screen device 12 will be described hereinafter in the context of an onboard infotainment system without limitation.

A user of the touch screen device 12 may select information and/or desired operating modes of one or more of the controlled subsystems 19, 190, and/or 290 via touch interaction with the touch surface 13. Such interaction may entail use of the input knob 16 alone or in conjunction with touch interaction with areas of the touch surface 13 lying outside of the input knob 16. That is, operation of the input knob 16 is not affected by touch inputs or swipes occurring in areas of the touch surface 13 lying outside of the input knob 16, with such a larger area denoted as area A2 in FIGS. 8A-C. Distinguishing touch points lying inside of the input knob 16 from those lying outside of the input knob 16 is therefore encompassed by the present method 50.

Figures 2A, 2B, 2C, 2D, 2E, 2F:
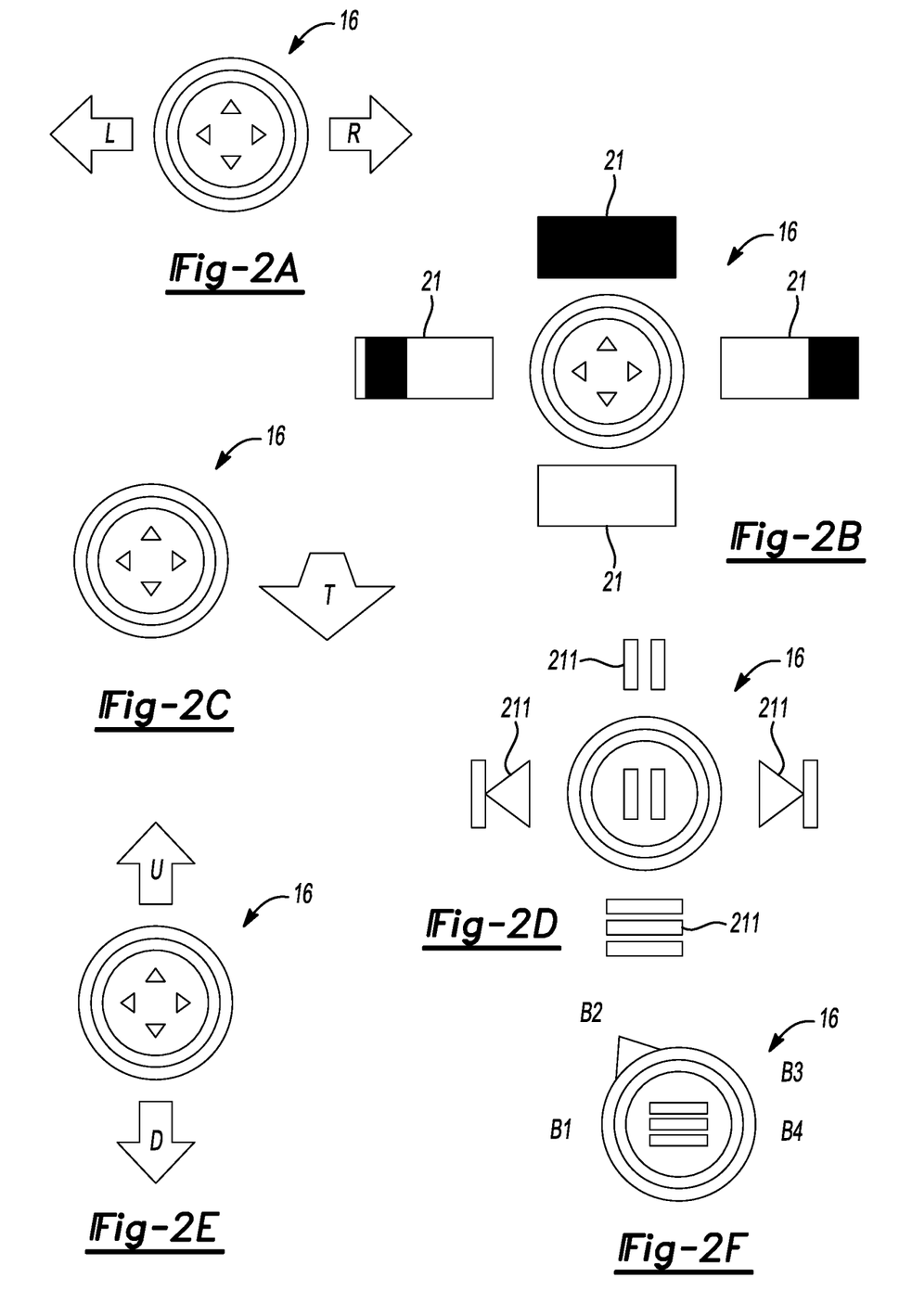
FIGS. 2A-F schematically depict examples of control functionality enabled by the input knob of FIG. 1.

Referring to FIGS. 2A-2F, the input knob 16 of FIG. 1 may be used in a variety of ways depending on the programming of the microcontroller 55 and the configuration of the controlled subsystems 19, 190, and 290. For instance, FIG. 2A depicts the option of the input knob 16 being moved in a lateral direction, i.e., left (L) or right (R) with respect the user's forward-facing frame of reference, to select an application or operating mode, or to change the displayed information on the touch surface 13 of FIG. 1. FIG. 2B depicts an embodiment in which an extended depression of the input knob 16 opens a set of preview icons 21 around the perimeter of the input knob 16 for selection by the user, with alternative icons 211 shown in FIG. 2D.

FIGS. 2C and 2E illustrate additional embodiments in which the input knob 16 may be urged in a particular direction around the perimeter of the input knob 16 to open or select corresponding information or operating modes from the touch surface 13, whether by pulling lightly on the input knob 16 as indicated by arrow T of FIG. 2C or urging the input knob 16 up or down as indicated by arrows U and D in FIG. 2E. Similarly, FIG. 2F illustrates a possible embodiment in which icons B1, B2, B3, B4 progressively appear or are continuously displayed as the input knob 16 is rotated. Depending on the embodiment and whether the input knob 16 is a 2-bit or a 3-bit device, pressing of the input knob 16 itself may trigger selection of a given mode or information piece, or rotation of the input knob 16 may accomplish this alone or in conjunction with registering of a separate touch event.

With respect to the configuration of the controlled subsystems 19, 190, and 290, as will be appreciated by one of ordinary skill in the art, the example touch screen device 12 of FIG. 1 may be used to control a wide variety of functions. By way of example, the controlled subsystem 19 may be a heating, ventilation, cooling, and air conditioning (HVAC) system and the controlled subsystem 190 may be a radio, with the controlled subsystem 290 being another device, e.g., a lighting system, a digital video disc or compact disc player, a navigation screen, etc. In certain embodiments, two or more of the controlled subsystem 19, 190, and 290 and the touch screen device 12 may be integrated into a single device, e.g., the above-noted infotainment system, and thus the depiction of separate subsystems 19, 190, and 290 and a separate touch screen device 12 is exemplary and non-limiting.

Figure 3:
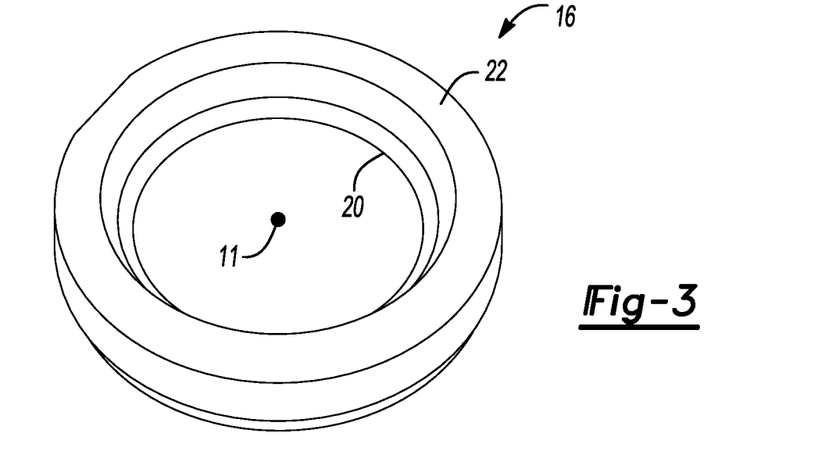
FIG. 3 is a schematic perspective view illustration of an example embodiment of the input knob shown in FIG. 1, with the input knob having a stationary member and a moveable member.
Figure 4:
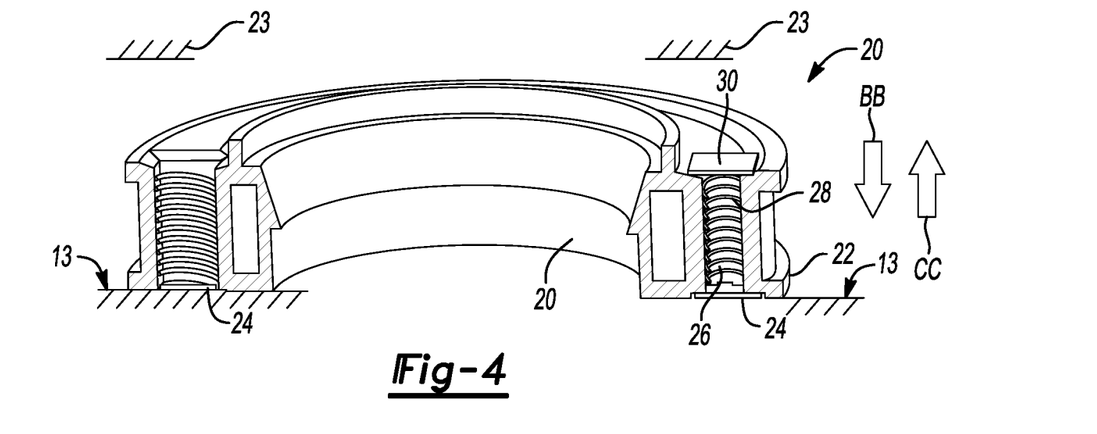
FIG. 4 is a schematic partial cross-section perspective view illustration of the example input knob shown in FIG. 3.

FIGS. 3 and 4 schematically illustrate the input knob 16 according to a non-limiting example embodiment. The input knob 16 may include respective stationary and moveable members 20 and 22, with the stationary member 20 forming an anchor that is permanently or removably attached to the touch surface 13 of FIG. 1, e.g., via an adhesive material, magnetic attraction, or other suitable attachment materials or mechanisms. The moveable member 22 engages the stationary member 20 in this embodiment, and rotates, translates, and/or otherwise moves with respect to the center point 11, e.g., as a control dial with optional click-based input functions. Thus, the stationary and moveable members 20 and 22 form the input knob 16 and work together as shown in the example of FIG. 4 to register discrete touch points on the touch surface 13 of FIG. 1. The moveable member 22 may be optionally constructed of or coated by a dielectric material. This particular feature would enable a user to operate the input knob 16 while wearing gloves, as a conductive path to the user's bare hand is not required for registration of touch points.

More specifically, the input knob 16 is configured to generate multiple discrete touch events in response to motion of the moveable member 22. For example, the input knob 16 may have two conductive base pads 24, with such base pads 24 embodied as small conductive contacts or pads of copper or other suitable material. The touch surface 13, which is shown schematically in FIG. 4, remains in direct contact with the conductive base pads 24. Because the base pads 24 are inserted into or integrally formed as part of the stationary member 20 of the illustrated embodiment, the base pads 24 do not move with respect to the touch surface 13, and thus form fixed reference positions on the input knob 16 for use in locating the center point 11.

In the non-limiting example embodiment of FIG. 4, a switch is formed, in this case by a spring 26 disposed within a spring bore 28. Opposite each conductive base pad 24, a corresponding outer conductive pad 30, e.g., a patch of copper, may ride on the spring 26. Although omitted for simplicity, the interior contour or configuration of the moveable member 22 is such that movement of member 22 will allow the outer conductive pad 30 to move outward/toward a user, as indicated by arrow CC, into direct contact with a conductive mass 23 housed within the moveable member 20 (see FIG. 3), e.g., a solid plate or block of ferromagnetic material or copper. Such contact occurs only at discrete points around a circumference of the input knob 16, specifically when the moveable member 22 is in a corresponding position over one or both of the conductive base pads 24.

The conductive mass 23 is used in the illustrated embodiment as a reference ground, with the specific mass used to construct the conductive mass 23 being at least about 10 grams in some embodiments, with the upper limit to the conductive mass 23 based on available packaging space or weight limits. In other words, the conductive mass 23 is sufficiently large, relative to the mass of the conductive base pads 24 and other connected structure forming the internal switch, to be effectively seen as the user from the perspective of the touch surface 13. The conductive base pads 24 and connected structure in the fixed member 22 used to form the parts of the internal switch located on the side of the stationary member 20 should be small enough that it does not consume a significant amount of the available signal, e.g., in the milligram range.

Continued movement of the moveable member 22 will cause the outer conductive pad 30 to move out of direct contact with the conductive mass 23 as indicated by arrow BB. The effects of the change in capacitance at the touch surface 13 due to the intermittently-connected conductive mass 23 at discrete touch points is detected by the microcontroller 55 and may be used in the present method 50 to register touch points and ultimately identify the input knob 16 as being of a particular type or configuration. Other embodiments may be envisioned for implementing such an intermittent switch connection between the conductive base pads 24 and the conductive mass 23 and thereby realize a digital/binary output signal as shown in FIG. 5, and therefore the example structure shown in FIG. 4 is intended to be non-limiting and illustrative of the present teachings.

Figure 5:
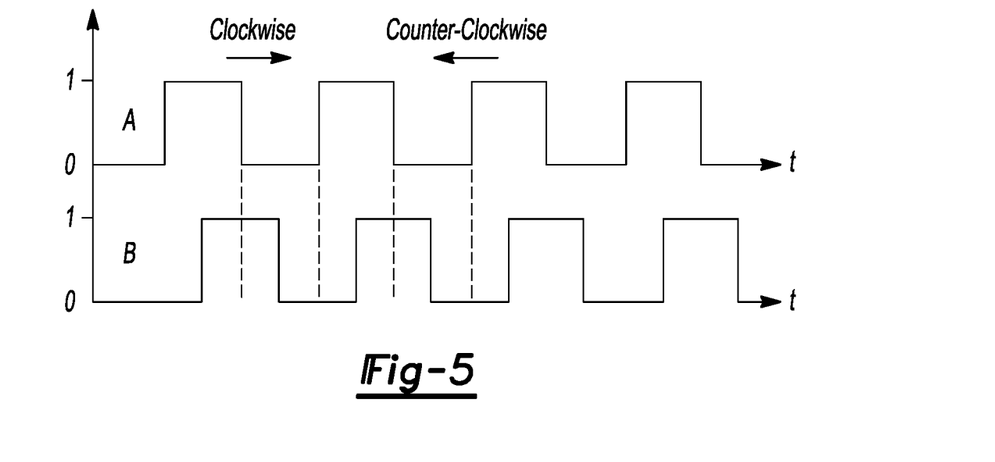
FIG. 5 is an example time plot of a pair of digital encoder signals generated by operation of the input knob of FIGS. 1-4 and used in the present method.

With two such conductive base pads 24 used in the illustrated example embodiment, the input knob 16 will output two decoupled digital bits, i.e., two digital encoder signals as shown in FIG. 5. As a result, the input knob 16 may embody a two-channel rotary encoder describing the rotational speed and direction of the moveable member 22. Additional bits in the same or different input knobs 16 may be used in some embodiments to increase accuracy, functionality, and/or redundancy. When three bits are used, for instance, the additional bit may trigger a momentary switch, e.g., pressing of the input knob 16 at additional conductive base pads 24 (see FIGS. 9C and 9D) may transmit the third bit to the microcontroller 55 to trigger performance of another operation, such as selection of a mode or display of additional information.

Referring to FIG. 5, the above-described input knob 16, when configured as an optional 2-bit digital encoder as shown in FIGS. 3 and 4, may output a pair of digital encoder signals A and B over a period of time (t) as the conductive mass 23 is placed in direct conductive contact with designated points on the touch surface 13. The digital encoder signals A and B thus embody square pulse trains having a low/0 state and a high/1 state. Because the input knob 16 is able to rotate in either the clockwise or the counter-clockwise rotational direction, the microcontroller 55 of FIG. 1 is configured, as part of the method 50, to automatically detect the rotational direction by processing of the digital encoder signals A and B.

Figure 6:
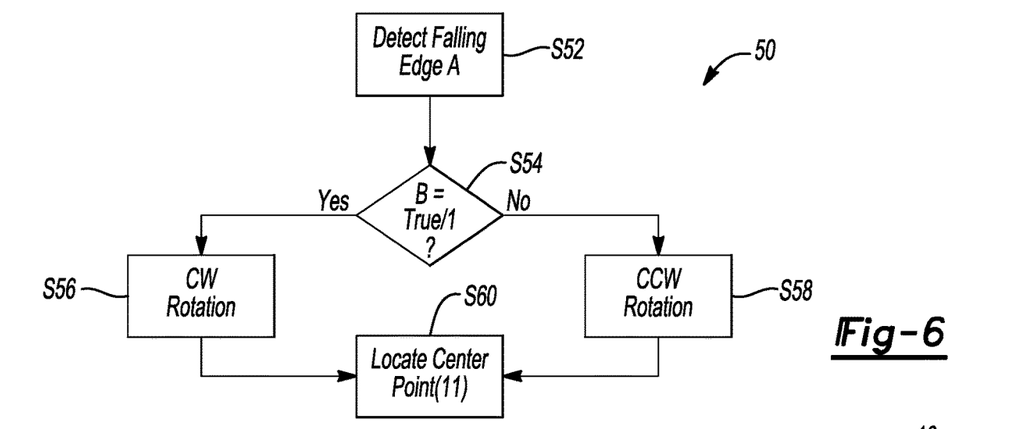
FIG. 6 is a flow chart describing an example embodiment of a method for registering and identifying the input knob of FIGS. 1-4.

FIG. 6 depicts a possible embodiment of the method 50 in which a two-bit encoder signal is used, with the input knob 16 being an optional rotary device, and with the encoder signals A and B of FIG. 5 serving as a working example. In such an embodiment, the conductive base pads 24 of FIG. 4 may be separated from each other by an angle of less than 180°, e.g., between 95° and 160°.

Beginning with step S52, the microcontroller 55 of FIG. 1 monitors digital encoder signal A to detect its falling edge. The falling edge is a change in logic state from high/1 to low/0. The method 50 proceeds to step S54 when the falling edge is detected.

At step S54, the microcontroller 55 determines, at the instant in time at which the falling edge is detected at step S52, whether the digital encoder signal B is high/1 or low/0. Such a decision is abbreviated as "B=TRUE/1?" in FIG. 6. The method 50 proceeds to step S56 when digital encoder signal B is high/1, and to step S58 when digital encoder signal B is low/0.

Sep S56 includes recording in memory (M) of the microcontroller 55 of FIG. 1 a diagnostic code indicative of the user rotating the input knob 16 in the clockwise (CW) direction. Such a code forms a first value for use in registering and identifying the input knob 16. The method 50 then proceeds to step S60.

Step S58 of method 50 includes recording in memory (M) of the microcontroller 55 a diagnostic code indicative of the user rotating the input knob 16 in the counter-clockwise (CCW) direction. As with step S56, such a code forms a first value for use in registering and identifying the input knob 16 of FIG. 1. The microcontroller 55 is thus made aware of the rotational direction of the input knob 16 and how it corresponds to displayed information. The method 50 then proceeds to step S60.

Step S60 includes locating the center point 11 on the touch surface 13 as a second value, and thereafter controlling an operation of the touch screen device 12 of FIG. 1 using the first and second values. For instance, the microcontroller 55 may be programmed with a plurality of display options, e.g., graphical programs or layouts of such display options, and to identify the rotary knob 16 from among a plurality of candidate input knobs 16 using the true position identified as part of method 50. The microcontroller 55 may then select a display option from the plurality of display options based on the identity of the input knob 16, and thereafter execute the corresponding graphical program. An example strategy for performing step S60 in other ways will now be described with additional reference to FIGS. 7-9C.

FIGS. 7A-D depict rotation of the input knob 16 with respect to the touch surface 13. A user may initiate such rotation at position P1 of FIG. 7A in which neither conductive base pad 24 of FIG. 4 is in conductive contact with the conductive mass 23 of FIG. 4, and thus no touch event is registered. For instance, if radio volume is progressively increased by clockwise rotation of the input knob 16, the microcontroller 55 may look for a particular sequence and location of touch inputs, with corresponding grid locations used to verify whether a given touch input is relevant to such a control task.

Figure 7A:
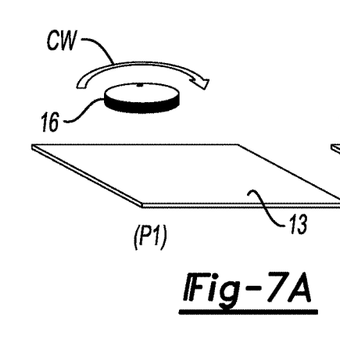
FIGS. 7A-D collectively depict a schematic movement sequence for the input knob of FIGS. 1-4.
Figure 7B:
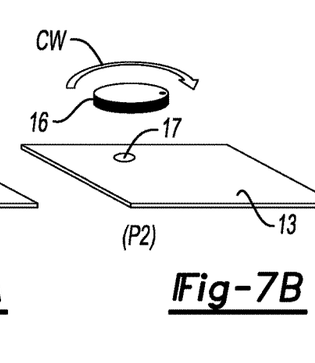
Figure 7C:
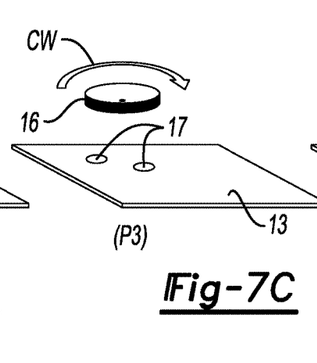

In a possible approach, as the input knob 16 is rotated in the clockwise direction by 90 degrees to position (P2) of FIG. 7B, one of the conductive base pads 24 of FIG. 4 makes conductive contact with the conductive mass 23 by operation of the above-described switch, with this occurring at an example touch point 17. As a result, the microcontroller 55 registers a touch event. Continuing with rotation of the input knob 16 another 90 degrees to position (P3) of FIG. 7C, two discrete touch points 17 are now registered as both conductive base pads 24 are placed in contact with the conductive mass 23 of FIG. 4, as indicated by two of the touch points 17.

Figure 7D:
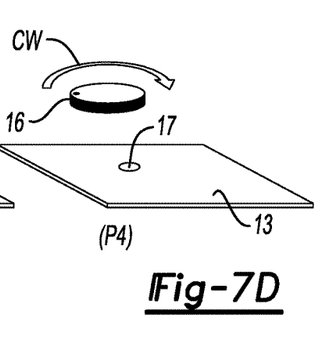

As the input knob 16 is rotated another 90 degrees to position (P4), the base pad 24 making contact with the conductive mass 23 at position (P2) of FIG. 7B no longer makes conductive contact at position (P4) shown in FIG. 7D, and thus only one touch point 17 is now registered. Thus, a direction of rotation or other movement may be detected as part of the method 50 by examining the falling edge of one digital encoder signal A with respect to the logic level of the other encoder signal B, as knowledge of the rotational direction is needed for proper calibration of the touch screen device 12 shown in FIG. 1.

Figure 8A:
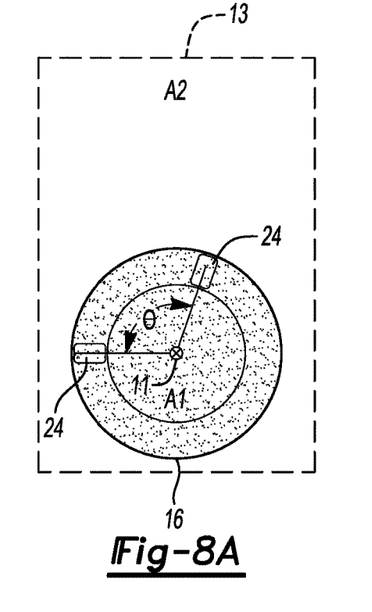
FIGS. 8A-C are schematic plan view depictions of a portion of a touch surface and the input knob collectively describing an example identification and registration sequence when two conductive base pads are used.
Figure 8B:
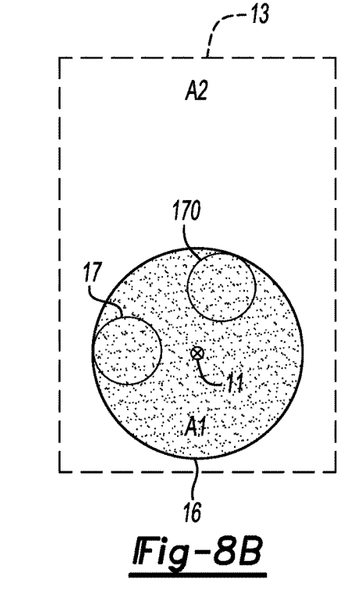
Figure 8C:
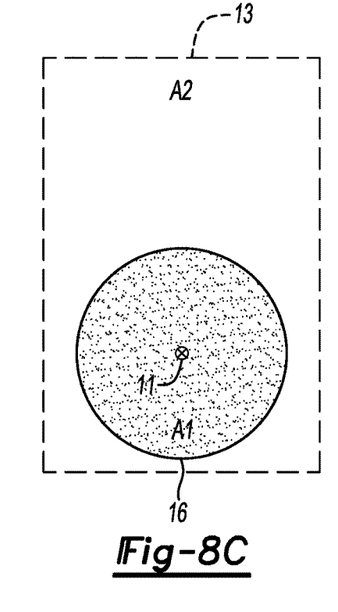

FIGS. 8A-C depict isolation of area A1 of the input knob 16 from the surrounding surface area A2 of the touch surface 13 as performed at step S60 of FIG. 6. Since the input knob 16 is an external physical object with respect to the touch surface 13, the microcontroller 55 of FIG. 1 may not be aware of the true position of the input knob 16 absent the calibration performed according to method 50. Additionally, while discrete touch points 17 are detectable, the microcontroller 55 does not know, absent the method 50, whether such touch points 17 are generated by the input knob 16 or by the user's finger/a stylus outside of area A1.

Therefore, as part of the method 50 the microcontroller 50 of FIG. 1 may automatically locate the touch points 17 and calculate the area A1 of the input knob 16. The microcontroller 55 may then treat touch events occurring outside of area A1 as being additional touch inputs, with the processor P processing or disregarding such additional touch inputs depending on the information displayed at a corresponding location of the touch surface 13. This function of the microcontroller 55 also allows the user to use the input knob 16 and the remaining area A2 of the touch surface 13 without causing the different touch events to conflict with each other.

As will be appreciated, due to the nature signal transmission in the type of input knob 16 contemplated herein, the microcontroller 55 may at times be required to recognize a false or negative touch event, i.e., when the input knob 16 has not changed its location on the touch surface 13 after first registering a positive touch event at the location. The microcontroller 55 may be configured to discard such false touch events, e.g., by filtering or comparing the false touch event to a historical record and discarding the false touch event if such a comparison indicates that the touch event remains positive. The microcontroller 55 may also adjust the configuration to prevent the inadvertent filtering of intended touches caused by typical configuration adjustments, e.g., by negative capacitance reading.

In some embodiments, the microcontroller 55 may be configured to determine whether the input knob 16 has moved to a second location on the touch surface 13 after a positive touch event was initially registered at a first location. For example, the microcontroller 55 may determine the first location of the input knob 16 on the touch surface 13, and then, after a period of time, determine whether the input knob 16 remains present at the first location. Alternatively, the microcontroller 55 may determine whether the input knob 16 is still present anywhere on the touch surface 13 after a calibrated time or duration, and if still present, determine whether the input knob 16 remains at the first location or has moved to a second location. Such functionality facilitates movement of the input knob 16 and reconfiguration or customization.

Figure 9A:
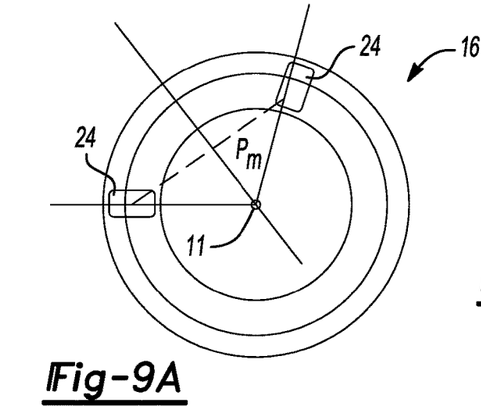
FIGS. 9A-D are additional schematic plan-view illustrations of the input knob shown in FIGS. 1-4 depicting possible geometric solutions for locating a true center point of the input knob.
Figure 9B:
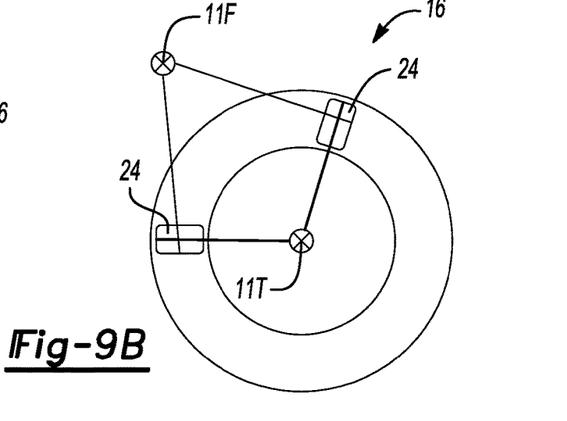
Figure 9C:
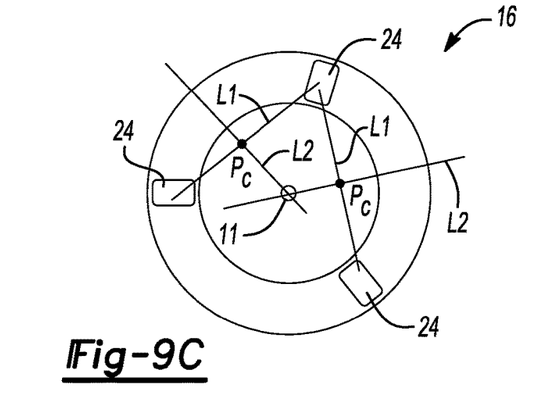
Figure 9D:
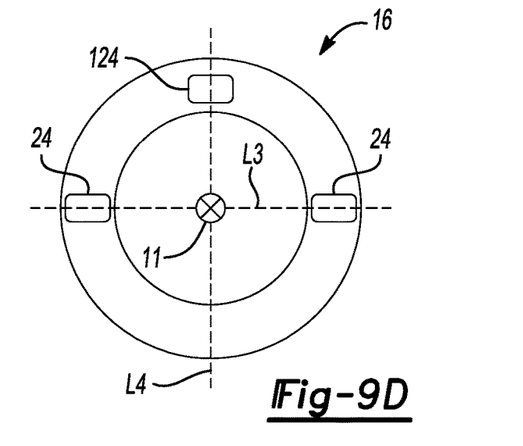

Referring to FIGS. 9A-D, as part of step S60 of FIG. 6, the microcontroller 55 finds a geometric solution for the true position of the center point 11. The algebraic complexity is diminished by establishing angles between conductive base pads 24 with respect to each other. Illustrated are two possible solutions, i.e., an input knob 16 equipped with two base pads 24 arranged at a predetermined angle ($\theta$) of less than 180° as shown in FIGS. 9A and 9B, and one with three such base pads 24 as shown in FIGS. 9C and 9D, with FIG. 9D showing a simplified case in which the base pads 24 are more or less diametrically opposite one another. With respect to the non-limiting two-contact embodiment, with a true center point 11 and a midpoint Pm between the conductive base pads 24, the microcontroller 55 may calculate the midpoint Pm as:

$$Pm = \left(\frac{x_1 + x_2}{2}, \frac{y_1 + y_2}{2}\right)$$

As two right triangles are presented in FIG. 9A, this yields two possible solutions for the x coordinate of center point 11, i.e., $x_C$:

$$x_C = \frac{-b \pm \sqrt{b^2 - 4ac}}{2a}.$$

The two possible position solutions corresponding to the center point 11 are shown in FIG. 9B as the true center point 11T and a false center point 11F.

The microcontroller 55 of FIG. 1 is configured to discard one of the two possible position solutions as being false, i.e., lying fully outside of the area A1 of the input knob 16. To do this, the microcontroller 55 may compare both possible position solutions, i.e., $x_{11}$ coordinates of the center points 11T and 11F, to a fixed reference point, such as coordinates of a point or points along an edge of the touch surface 13. The position lying closest to the reference point may be discarded as a false solution, with the microcontroller 55 using the remaining position solution as the true center point 11 of the input knob 16. This does not mean the false touch point is not valid, but rather that the false touch point cannot have originated with the input knob 16. For instance, the false touch point could coincide with a user's separate touch of the touch surface 13.

FIG. 9C depicts a solution to locating the center point 11 of an input knob 16 when three conductive base pads 24 are used. The method 50 may be used with a three-bit encoder signal, i.e., with three conductive base pads 24. In such a case, the base pads 24 may be separated by 60°, although the present approach will work with other angle values such as 90° in FIG. 9D. With three conductive base pads 24, only one position solution exists, and the microcontroller 55 can therefore triangulate the center point 11. That is, with $r^2$ defined, the microcontroller 55 may establish lines L1 between the known positions of the base pads 24 and then draw perpendicular lines L2 to the center points $P_C$ of lines L1. The intersection of the perpendicular lines L2 is the center point 11 of the input knob 16. As area A1 of the rotary knob 16 is known or calculated as shown in FIG. 8B, the microcontroller 55 can readily distinguish between touch points occurring due to operation of the input knob 16 from those separately imparted to area A2.

FIG. 9D depicts yet another configuration in which two conductive base pads 24 are disposed about 180° apart, i.e., within 5-10°, with a third base bad 124 disposed 90° apart and midway between the base pads 24. The areas of the base pads 24 are known, as is the radius r. The microcontroller 55 seeks the position of base pad 124. To do so, the microcontroller 55 may define the center point 11 as set forth above, i.e.:

$$Pm = \left(\frac{x_1 + x_2}{2}, \frac{y_1 + y_2}{2}\right)$$

Line L3 exists between the base pads 24. As the x and y positions of the base pads 24 are known, so too is the line L3. The microcontroller 55 may find the slope $m_4$ to a "click event" occurring at a third base pads, i.e., base pad 124 as follows:

$$m_4 = \frac{x_2 - x_1}{y_2 - y_1}$$

where subscripts 1 and 2 refer to the x or y coordinate of the respective base pads 24, e.g., with 1 being the base pad 24 shown to the left in FIG. 9C and 2 being the base pad 24 on the right, or vice versa, subscript 3 being the x or y coordinate of the center point 11, and subscript 4 referring to the x or y coordinate of the base pad 124.

A line L4 running from the base pad 124 through the center point 11, may be calculated by finding $y_4$ as follows:

$$y_4 = -\left(\frac{x_2 - x_1}{y_2 - y_1}\right)x_4 + \left(y_3 + \frac{x_2 - x_1}{y_2 - y_1}x_3\right)$$

Thus, to find the x coordinate of a "click point" or location of the base pad 124:

$$x_4 = \{[a\tan(m_4)]*r\} \pm x_3.$$

As will be appreciated by one of ordinary skill in the art, aspects of the above-described method 50 may captured via computer-readable medium, e.g., part of the memory (M) shown schematically in FIG. 1, on which is recorded computer-readable instructions executable by the processor P. Execution of such instructions causes the processor (P) to receive a plurality of digital encoder signals, e.g., signals A and B of FIG. 5, as the moveable member 22 of FIG. 3 rotates with respect to the stationary member 20, with such signals being indicative of a plurality of discrete touch points between the touch surface 13 and the input knob 16 described herein. The processor P may thereafter process the encoder signals to determine a direction of movement of the input knob 16 as a first value, derive a true position of the center point 11 of the input knob 16 as a second value using a position of each of the conductive base pads 24 of FIG. 4, and thereafter control an operation of the touch screen device 12 of FIG. 1 using the first and second values. Execution of the instructions may also cause the processor (P) to identify the input knob 16 from among a plurality of candidate input knobs 16 using the true position, to select a display option from a plurality of display options based on the identity of the input knob 16, and to present the selected display option via the touch surface 13.

Use of the input knob 16 according to the method 50 thus enables additional functionality of the system 10 of FIG. 1. Knowledge of the true position and rotational direction of the input knob 16 allows the input knob 16 to be placed on the touch surface 13 with some amount of variation and still function as intended. Once a particular embodiment of the system 10 has been designed, production error due to slight misplacement of the input knob 16 may be reduced. Similarly, if the input knob 16 requires replacement during its operating life, e.g., due to wear, the input knob 16 may be removed, replaced, and quickly recalibrated via method 50 at startup according to the present teachings.

Additionally, as noted above, during production or in an aftermarket content, a plurality of input knobs 16 may be configured for us with the touch screen device 12 of FIG. 1.

The microcontroller 55 in executing the method 50, and by uniquely identifying a particular input knob 16 attached to the touch surface 13 by type and also registering its position with the respect to the touch surface 13, is able to control the content of the information displayed on the touch surface 13. For example, if a given input knob 16 has three or more conductive base pads 24, such an input knob 16 may correspond to a first set of information, e.g., a sport mode. An input knob 16 having two conductive base pads 24 may correspond to another mode, perhaps one with fewer display options.

Likewise, recognizing an input knob 16 on one half of the touch surface 13 may be distinguished from an input knob 16 on another half of the touch surface 13. Since in some embodiments the stationary member 22 may be removed and repositioned on the touch surface 13, the microcontroller 55 is able to identify the input knob 16 at start up and register its new position on the touch surface 13. By recognizing the type and/or location of the input knob 16 connected to the touch surface 13, the microcontroller 55 may make a control decision as to which corresponding information should be displayed. This may greatly simplify programming and part number stocking by allowing the display content to be tailored to the input knob 16 automatically during start up or when replacing the input knob 16. These and other benefits will be readily apparent to one of ordinary skill in the art in view of this disclosure.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A touch screen device comprising:
   a touch surface;
   an input knob having a stationary member and a moveable member that engages the stationary member on a common side of the touch surface, wherein the stationary member is permanently or removably attached to the touch surface, the moveable member is configured to move with respect to the stationary member, and the input knob is characterized by an absence of a direct electrical connection to the touch surface; and
   a microcontroller in communication with the touch surface via a low-voltage bus, wherein the microcontroller is programmed to:
      receive a plurality of digital encoder signals as the moveable member moves with respect to the stationary member, wherein the plurality of digital encoder signals is indicative of a plurality of discrete touch events between the moveable member and the touch surface;
      process the plurality of digital encoder signals to determine a direction of movement of the moveable member as a first value;
      derive a true position of a center point of the input knob as a second value; and
      control an operation of the touch screen device using the first and second values;
   wherein the microcontroller is connected to at least one controlled subsystem and is configured to control the operation of the touch screen device by selecting an operating mode of the at least one controlled subsystem.

2. The touch screen device of claim 1, wherein the moveable member is rotatable with respect to the stationary member.

3. The touch screen device of claim 1, wherein the microcontroller is programmed with a plurality of display options, and is further programmed to identify the input knob from among a plurality of candidate input knobs using the true position, and to select a display option from the plurality of display options based on an identity of the input knob identified by the microcontroller.

4. The touch screen device of claim 1, wherein the stationary member includes a pair of conductive pads in direct contact with the touch surface and in selective contact with a conductive mass of the moveable member, the pair of conductive pads being disposed at an angle of less than 180° with respect to each other such that the true position of the center point has two possible position solutions, and wherein the microcontroller derives the true position of the center point by determining which of the two possible position solutions lies within an area of the input knob.

5. The touch screen device of claim 4, wherein the microcontroller is configured to determine which of the two possible position solutions lies within an area of the input knob by determining a linear distance from each of the two possible position solutions to a reference position, and then discarding one of the two possible position solutions that is farthest away from the reference position.

6. The touch screen device of claim 1, wherein the at least one controlled subsystem includes a heating, ventilation, and air conditioning (HVAC) system, and wherein the operating mode includes a temperature or fan setting of the HVAC system.

7. The touch screen device of claim 1, wherein the touch screen device is an infotainment system, and wherein the operating mode is a mode setting of the infotainment system.

8. The touch screen device of claim 1, wherein the stationary member is removable from and repositionable with respect to the touch surface.

9. The touch screen device of claim 1, wherein the moveable member is constructed of or coated by a dielectric material.

10. A method for registering and identifying an input knob for a touch screen device having a display screen with a touch surface, wherein the input knob includes a stationary member that is permanently or removably attachable to the touch surface, and a moveable member that is engaged with the stationary member on a common side of the touch surface, the moveable member having a plurality of conductive base pads oriented facing the touch surface, containing a conductive mass, and being moveable with respect to the stationary member, and wherein the input knob is characterized by an absence of a direct electrical connection to the touch surface, the method comprising:
   receiving, via a microcontroller, a plurality of digital encoder signals as the moveable member moves with respect to the stationary member, wherein the plurality of digital encoder signals is indicative of a plurality of discrete touch events between the conductive mass of the input knob and at least one of the plurality of conductive base pads;
   processing, in the microcontroller, the plurality of digital encoder signals to determine a direction of movement of the moveable member as a first value;
   deriving, in the microcontroller, a location of the input knob on the touch surface, including determining a true position of a center point of the input knob as a second value using a position of each of the plurality of conductive base pads;

controlling, via the microcontroller, an operation of the touch screen device using the first and second values, including adjusting a layout of a display option based on the location of the input knob.

11. The method of claim 10, further comprising:

determining, via the microcontroller, a location of the input knob on the touch surface; and determining via the microcontroller, after a period of time, whether the input knob is still present at the location on the touch surface.

12. The method of claim 10, wherein the microcontroller is programmed with a plurality of display options, the method comprising:

identifying the input knob from among a plurality of candidate input knobs using the position of two or more of the plurality of conductive base pads; and selecting and executing a display option from the plurality of display options via the microcontroller based on the identity of the input knob.

13. The method of claim 10, wherein the plurality of conductive base pads includes a pair of conductive pads disposed at an angle of less than 180° with respect to each other, such that the true position of the center point has two possible position solutions, the method further comprising deriving the true position of the center point by determining which of the two possible position solutions lies within an area of the input knob.

14. The method of claim 13, wherein determining which of the two possible position solutions lies within an area of the input knob includes determining a linear distance from each of the two possible position solutions to a reference position and discarding one of the two possible position solutions that is farthest away from the reference position.

15. The method of claim 10, wherein controlling the operation of the touch screen device includes selecting an operating mode of at least one controlled subsystem.

16. The method of claim 15, wherein the at least one controlled subsystem includes a heating, ventilation, and air conditioning (HVAC) system, and wherein the operating mode includes a temperature or fan setting of the HVAC system.

17. The method of claim 15, wherein the touch screen device is an infotainment system, and wherein the operating mode is a mode setting of the infotainment system.

18. A non-transitory computer-readable medium on which is recorded instructions, executable by a processor in communication with a rotary knob for a touch screen device having a display screen with a touch surface, the rotary knob including a stationary member that is permanently or removably attachable to the touch surface, and a rotatable member engaged with the stationary member on a common side of the touch surface, the stationary member having a plurality of conductive base pads oriented facing the touch surface, and the rotatable member containing a conductive mass, wherein the rotatable member is rotatable with respect to the stationary member, the rotary knob is characterized by an absence of a direct electrical connection to the touch surface, and execution of the instructions causes the processor to:

receive a plurality of digital encoder signals as the rotatable member rotates with respect to the stationary member, wherein the plurality of digital encoder signals is indicative of a plurality of discrete touch events between the conductive mass and one or more of the plurality of conductive base pads;

process the plurality of digital encoder signals to determine a direction of rotation of the rotatable member as a first value;

derive a true position of a center point of the rotary knob as a second value using a position of each of the plurality of conductive base pads; and control an operation of the touch screen device using the first and second values, including adjusting a layout of a display option of the touchscreen device based on the true position of a center point of the input knob.

* * * * *